EFFECT OF CATALYST POSIONS ON GAS EVOLUTION RATE AT OPEN CIRCUIT CONDITIONS

EFFECT OF S= IN THE ELECTROLYTE ON THE POLARIZATION CHARACTERISTICS OF HYDRAZINE ELECTRODE (7M KOH+ 2M $N_2H_4$)

EFFECT OF Se= IN THE ELECTROLYTE ON THE POLARIZATION CHARACTERISTICS OF HYDRAZINE ELECTRODE (7M KOH 2M $N_2H_4$)

United States Patent Office 3,553,028
Patented Jan. 5, 1971

3,553,028
METHOD FOR GENERATING ELECTRICITY IN HYDRAZINE-OXYGEN FUEL CELL
Seigo Matsuda, Wayland, Mass., assignor to Monsanto Research Corporation, St. Louis, Mo., a corporation of Delaware
Filed Dec. 16, 1968, Ser. No. 783,886
Int. Cl. H01m 27/00
U.S. Cl. 136—86                                    7 Claims

ABSTRACT OF THE DISCLOSURE

The performance characteristics of a hydrazine fuel cell anode can be selectively adjusted and/or controlled by introducing minor amounts of sulfur or selenium to the site of anodic activity.

Figure 1:
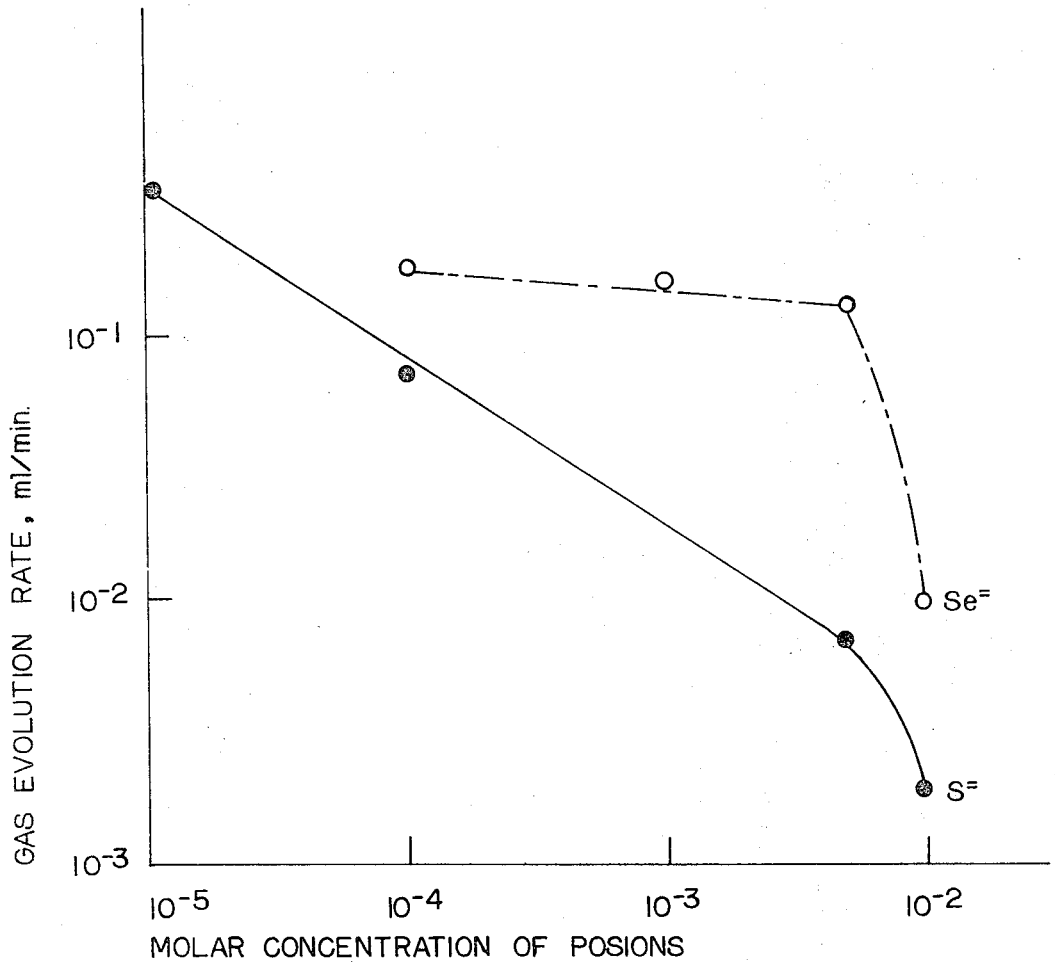

BACKGROUND OF THE INVENTION (Part 1) The field of the invention

This invention relates to hydrazine-air fuel cells. More precisely, the invention defined herein relates to hydrazine fuel cells wherein the performance characteristics thereof can be selectively adjusted and/or controlled.

(Part 2) Description of the prior art

Hydrazine-air fuel cells are known to the art. They can operate at relatively high efficiency at ambient temperatures over extended periods of time. Those skilled in the art presently believe that the major reactions which occur on the anode and cathode of hydrazine-air fuel cells are as follows:

Anodic reaction: $N_2H_2 + 4OH^- \rightarrow 4H_2O + N_2 + 4e^-$
Cathodic reaction: $O_2 2H_2O \rightarrow 4OH^- - 4e^-$
Total cell reaction: $N_2H_4 + O_2 \rightarrow 2H_2O + N_2$ Accordingly, when current is drawn from a hydrazine-air fuel cell, hydrazine and oxygen are consumed producing water and nitrogen gas as end products of the electrochemical reactions occurring at the electrodes.

SUMMARY OF THE INVENTION

In accordance with the practice of the present invention the performance characteristics of a hydrazine-air fuel cell anode can be selectively controlled and/or adjusted in an advantageous fashion by introducing a minor amount of sulfur and/or selenium to the site of anodic activity. As those skilled in the art know, sulfur and selenium are notoriously regarded as poisons for anodic catalyts materials normally employed in hydrazine-air fuel cells. Accordingly, the discovery that these "poisons" can be advantageously employed to selectively control and adjust the performance characteristics of the anode is surprising and unexpected in view of the state of the art.

DESCRIPTION OF PREFERRED EMBODIMENTS

Anodes presently employed in hydrazine-air fuel cells essentially comprise a substrate coated or otherwise associated with a catalyst for decomposing hydrazine. The substrates can comprise non-metallic as well as metallic compositions. Substrates comprising plastomeric materials such as polytetrafluoroethylene for example are well known to the art. However, metallic substrates are normally preferred in anodes presently used in hydrazine-air fuel cells. The metal substrates most frequently employed are those of iron, silver or nickel with nickel being generally preferred. The substrates can be in the form of plaques or discs which can be either porous or non-porous.

Many catalysts for decomposing hydrazine are known to the art. The preferred catalysts include the noble metals such as metals of the platinum and palladium family of the periodic system. Other materials which can be employed as catalysts or co-catalysts are metal chelates such as phthalocyanines of Cr, Co, Ni, Cu and Pd; bis-salicylaldehydeethylenediimines of Co, Ni, Cu and Pd; bis-8-hydroxyquinolinolates of Fe, Co, Ni, Cu and Pd; bis-5-hydroxyanthraquinones of Co, Ni, Cu and Pd; bis-dithiocarbamates of Co, Cu and Ni and the like. Still another class of materials which can also be employed as catalysts or co-catalysts are the interstitial compounds of transition metals such as the borides, carbides, nitrides, carbonitrides and nitrocarbides of such metals as iron, cobalt and nickel and the like. The manners and methods for applying or coating the catalysts or combinations thereof to the diverse substrates need not be described in detail. These manners and methods are well known to those skilled in the art to which the present invention pertains.

In accordance with the practice of the present invention, the performance of a hydrazine-air fuel cell anode can be advantageously controlled and/or adjusted by introducing sulfur ions, selenium ions or mixtures thereof to the site of anodic activity. The sulfur and/or selenium is most conveniently introduced to the site of anodic activity by adding soluble compounds of sulfur and/or selenium to the anolyte. The amount of sulfur and/or selenium employed in the practice of the present invention is sufficient to provide a solution of anolyte having a concentration of sulfur and/or selenium between about $10^{-2}$ M to about $10^{-5}$ M.

The particular concentration of sulfur and/or selenium employed will depend primarily upon the particular performance characteristic to be adjusted and/or controlled. For example, the larger concentrations of sulfur and/or selenium, e.g. about $10^{-4}$ M to about $10^{-2}$ M can be advantageously employed to adjust and/or control the excess gas evolution and/or the amount of $NH_3$ in the evolved gas during operation of the cell. It has been found that the amount of $NH_3$ evolved is directly related to the increase in concentration of sulfur and/or selenium. This relationship is detected up to a sulfur and/or selenium concentration of about $10^{-2}$ M. The lower concentrations of sulfur and/or selenium, e.g. from about $10^{-4}$ M to about $10^{-5}$ M or somewhat lower can be advantageously employed to adjust operating potential. In this aspect of the invention, it has been found that there is an inverse relationship between potential and the concentration of sulfur and/or selenium.

Figure 2:
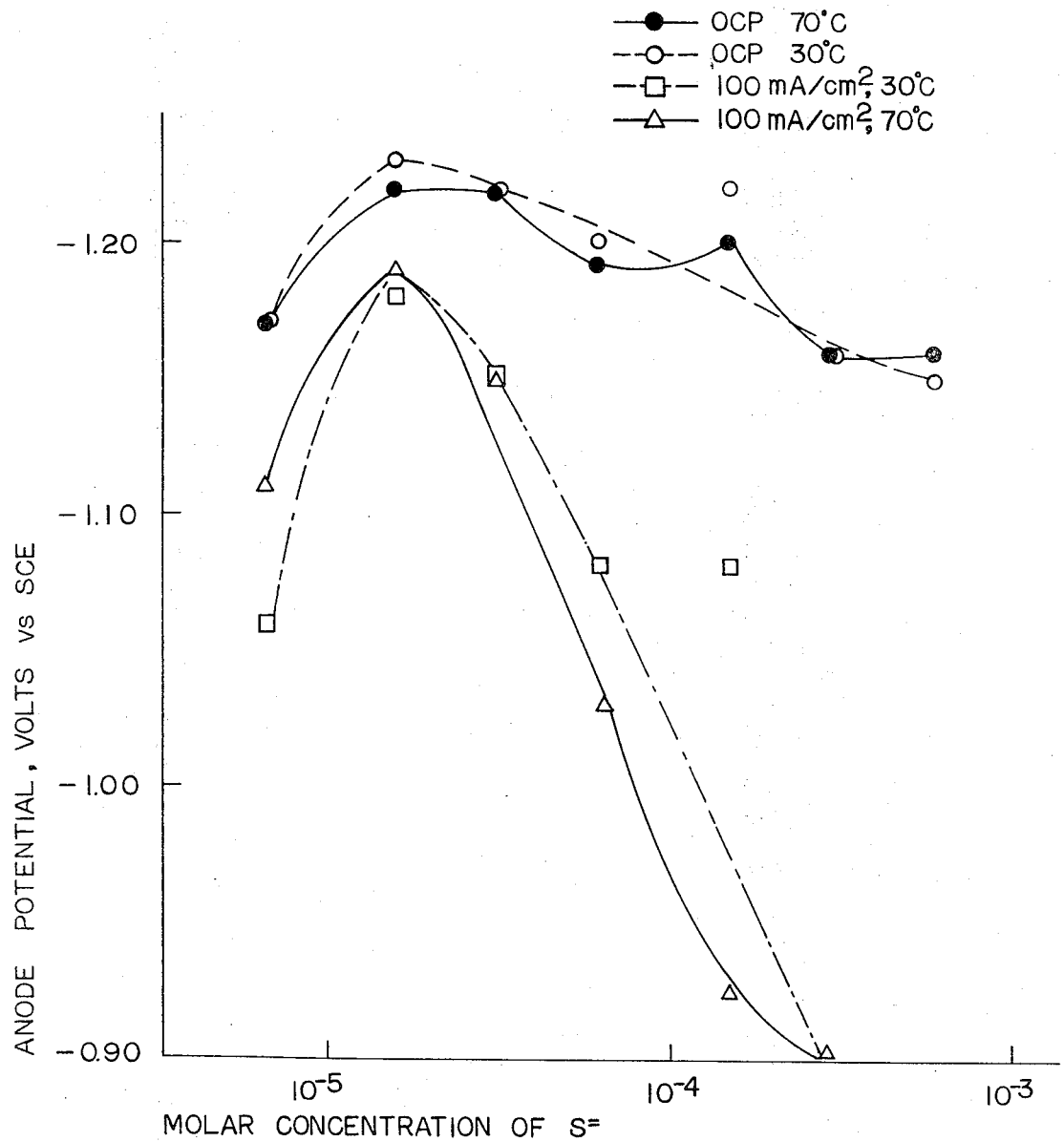
Figure 3:
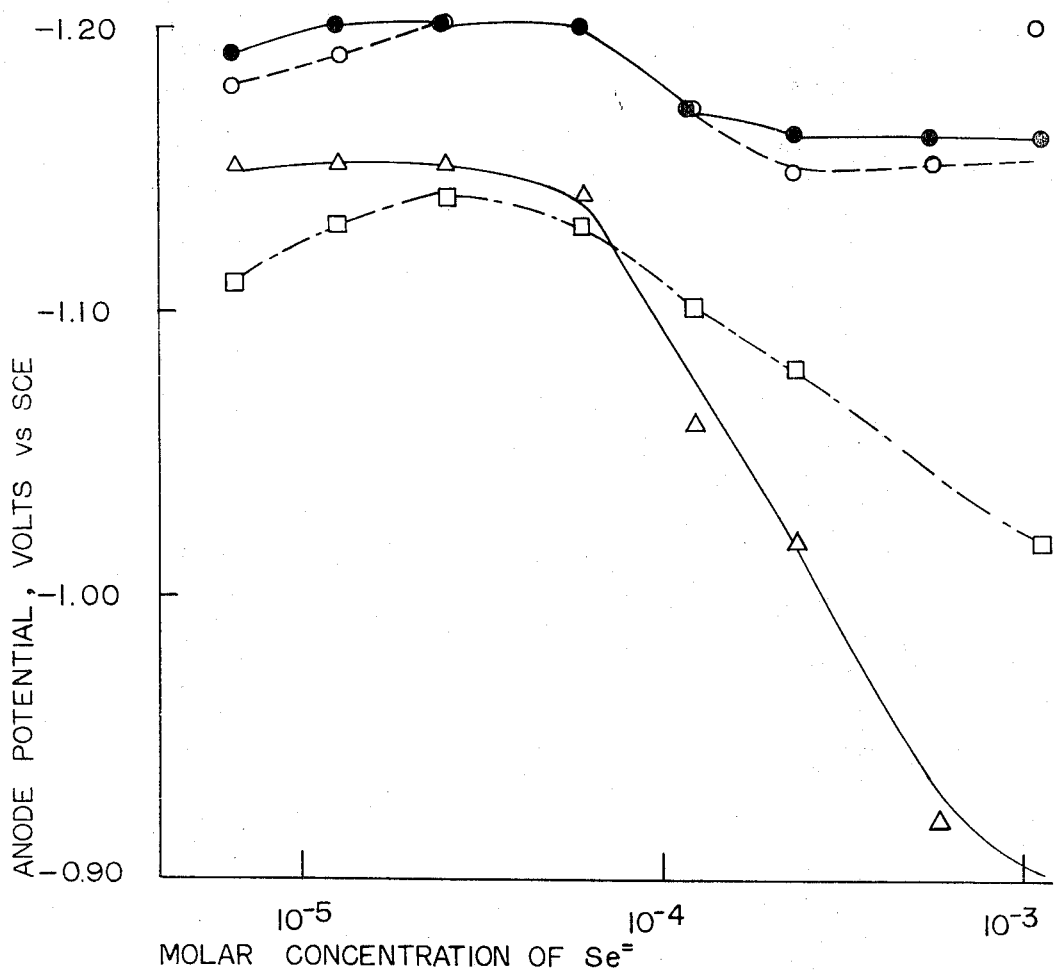

The invention and advantages obtained in the practice thereof will be better understood by reference to the data diagrammatically illustrated in the attached FIGS. 1–3. FIG. 1 illustrates the effect of the concentration of $S^=$ and $Se^=$ in the anolyte on the total gas exolution rate of the hydrazine electrode at open circuit conditions. The anolyte employed was 5 M KOH + 2 M $N_2H_4$ with various concentrations of $S^=$ and $Se^=$ added as $Na_2S$ and $Na_2Se$ respectively. The figure illustrates that the total gas evolution rate which is an indication of fuel efficiency can be selectively adjusted by employing anolytes comprising $S^=$ or $Se^=$ in concentrations ranging from about $10^{-2}$ M to about $10^{-4}$ M and especially from about $10^{-2}$ M to about $10^{-3}$ M.

FIG. 2 illustrates the effect of the concentration of $S^=$ in the anolyte on the polarization characteristics of the hydrazine electrode. The hydrazine electrode was a porous nickel plaque chemiplated with 10 mg./in.$^2$ of Pd black. The anolyte employed was 7 M KOH + 2 M $N_2H_4$ with various concentrations of $S^=$ added to the anolyte as $Na_2S$. FIG. 3 illustrates the effect of concentration of $Se^=$ in the anolyte on the polarization characteristics of the hydrazine electrode. The anolyte was the same as that employed to obtain the data of FIG. 2 but $Na_2Se$ was included therein rather than $Na_2S$. The figures reveal that the anode potential can be selectively adjusted by employing anolytes containing concentrations of sulfur and selenium from about $10^{-5}$ M to about $10^{-3}$ M and especially between about $10^{-4}$ M to about $10^{-5}$ M.

Various modifications of incidental details relating to hydrazine-air fuel cells can be employed in the practice of the present invention without departing from the spirit and scope thereof. For example, various electrolytes other than KOH can be employed in the anolyte at various concentrations. These and like modifications will be apparent to those skilled in the art.

Having described the invention together with preferred embodiments thereof, what is declared as new and desired to be secured by U.S. Letters Patent is as follows:

I claim:

1. In the method for generating electricity by the operation of a hydrazine-oxygen fuel cell having catalytic electrodes comprising an anode and cathode wherein an anolyte is supplied to said anode and an oxidant feedstock is fed to said cathode, the improvement wherein said anolyte contains a substance chosen from the group consisting of sulfur, selenium and mixtures thereof in a concentration between about $10^{-2}$ M to about $10^{-5}$ M.

2. The method of claim 1 wherein said substance is sulfur.

3. The method of claim 1 wherein said substance is selenium.

4. The method of claim 1 wherein said substance is sulfur and said concentration is between about $10^{-2}$ M to about $10^{-3}$ M.

5. The method of claim 1 wherein said substance is sulfur and said concentration is between about $10^{-4}$ M to about $10^{-5}$ M.

6. The method of claim 1 wherein said substance is selenium and said concentration is between about $10^{-2}$ M to about $10^{-3}$ M.

7. The method of claim 1 wherein said substance is selenium and said concentration is between about $10^{-4}$ M to about $10^{-5}$ M.

References Cited

UNITED STATES PATENTS

| | | | |
|---|---|---|---|
| 3,382,103 | 5/1968 | Smith | 136—86 |
| 3,442,711 | 5/1969 | Vielstich | 136—86 |

WINSTON A. DOUGLAS, Primary Examiner

A. SKAPARS, Assistant Examiner